United States Patent
Moore et al.

(10) Patent No.: US 6,428,609 B1
(45) Date of Patent: Aug. 6, 2002

(54) EXHAUST PARTICULATE CONTROLLER AND METHOD

(75) Inventors: Gary M. Moore, Los Gatos; Katsuhito Nishikawa, San Jose, both of CA (US)

(73) Assignee: Moore Epitaxial, Inc., Tracy, CA (US)

( * ) Notice: Subject to any disclaimer, the term of this patent is extended or adjusted under 35 U.S.C. 154(b) by 2 days.

(21) Appl. No.: 09/658,418

(22) Filed: Sep. 8, 2000

(51) Int. Cl.⁷ .............................. B01D 45/08; F01N 3/00
(52) U.S. Cl. .............................. 95/272; 55/435; 55/446; 55/462; 55/DIG. 30
(58) Field of Search ........................ 95/267, 272; 55/442, 55/445, 446, 462, 464, 465, DIG. 30, 435

(56) References Cited

U.S. PATENT DOCUMENTS

| | | | | |
|---|---|---|---|---|
| 512,681 A | * | 1/1894 | Clute | 55/446 |
| 1,735,789 A | * | 11/1929 | Powell | 55/442 |
| 3,754,398 A | * | 8/1973 | Mattavi | 60/298 |
| 4,556,584 A | | 12/1985 | Sarkozy | 427/54.1 |
| 4,735,633 A | | 4/1988 | Chiu | |
| 5,417,934 A | | 5/1995 | Smith et al. | 422/177 |
| 5,422,081 A | | 6/1995 | Miyagi et al. | 422/170 |
| 5,819,683 A | * | 10/1998 | Ikeda et al. | 118/715 |
| 6,099,649 A | * | 8/2000 | Schmitt et al. | 118/715 |

FOREIGN PATENT DOCUMENTS

EP 0 823 279 A2 2/1998
EP 0 823 279 A3 10/1998

* cited by examiner

Primary Examiner—Robert A. Hopkins
(74) Attorney, Agent, or Firm—Gunnison, McKay & Hodgson, L.L.P.; Forrest Gunnison

(57) ABSTRACT

An exhaust gas particulate controller is included between an exhaust of a barrel chemical vapor deposition reactor and the gas scrubber system. The exhaust gas particulate controller is positioned as close to the exhaust of the reactor as is practical. The exhaust gas particulate controller is a passive system that prevents generation of particulates associated with gas density changes that occur during processing within the reactor.

16 Claims, 12 Drawing Sheets

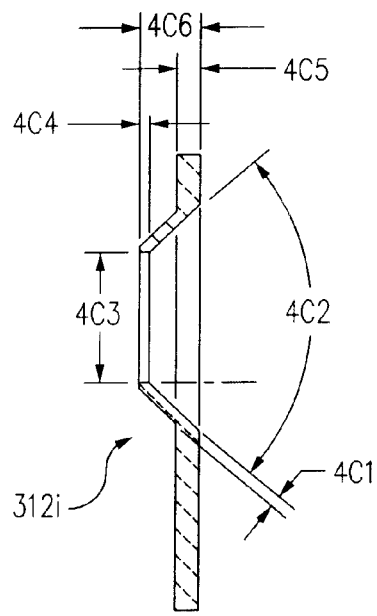
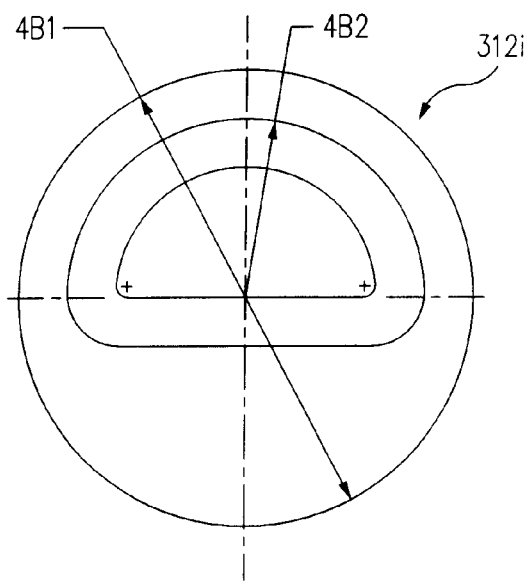
FIG. 4C
FIG. 4B
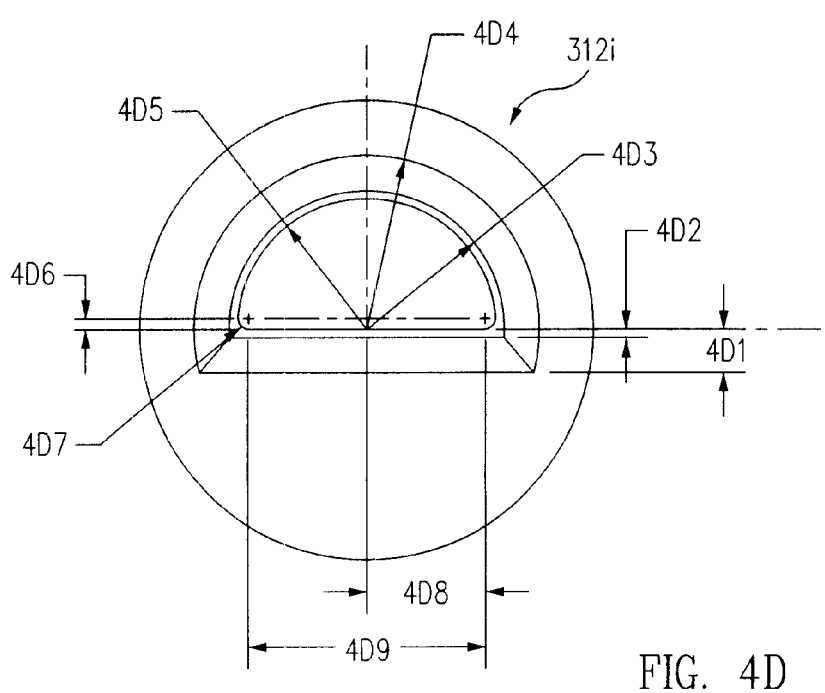
FIG. 4D

EXHAUST PARTICULATE CONTROLLER AND METHOD

FIELD OF THE INVENTION

This invention relates generally to reactors for processing semiconductor substrates, and more particularly, to exhaust systems for barrel epitaxial reactors.

BACKGROUND OF THE INVENTION

A variety of reactors has been used to process semiconductor substrates. Some of these reactors have incorporated extraction systems to process gases exhausted from the reactors.

U.S. Pat. No. 4,556,584, entitled "Method For Providing Substantially Waste-Free Chemical Vapor Deposition of Thin-Film on Semiconductor Substrates," of Sarkozy issued on Dec. 3, 1985 disclosed a system that included a first comparatively low-efficiency thin-film deposition stage and a second comparatively high-efficiency effluent-waste stream removing stage for depositing substantially all of the effluent-waste stream produced by the deposition stage onto disposable baffles. As described by Sarkozy, the second stage was an ultraviolet enhanced vacuum chemical vapor deposition diffusion furnace.

U.S. Pat. No. 4,753,633, entitled "Method and System for Vapor Extraction From Gases," of Chiu issued on Apr. 5, 1988 disclosed a plasma extraction reactor for removing vapor phase waste from effluent gas streams. This patent simply uses a different type of reactor in the exhaust stream.

Yet another type of heated reaction chamber is disclosed in U.S. Pat. No. 5,417,934, entitled "Dry Exhaust Gas Conditioning," of Smith and Timms issued on May 23, 1995. In this apparatus, exhaust gases are exposed first to silicon, or a silicon-rich alloy or substance, and then exposed to calcium oxide or a calcium containing mixture. The apparatus was surrounded by a hollow cylindrical heater that incorporated an electrical resistance heater.

European Patent Application Publication No. EP 0 823 279 A2, entitled "Method and Apparatus for Treating Exhaust Gases From CVD, PECVD or Plasma Etch Reactors" taught yet another exhaust gas reactor configuration. Again, the exhaust gas reactor configuration included an electrically heated jacket.

U.S. Pat. No. 5,422,081, entitled "Trap Device for Vapor Phase Reaction Apparatus," of Miyagi issued on Jun. 6, 1995 disclosed a trap that did not utilize a heater. Miyagi taught that for efficient removal a combination of small diameter discs (57 mm outer diameter and 52 mm inner diameter) and large diameter discs (119 mm outer diameter and 94 mm inner diameter) of stainless steel or aluminum. Miyagi taught that the spacing between the discs was critical in determining the collection efficiency.

Thus, these prior art disclosures show that while exhaust traps have been used, a given trap configuration is dependent both on the gases treated, the configuration of the trap, and characteristics of the particular reactor associated with the trap. Consequently, a particular trap design cannot be migrated to another reactor configuration. These prior art exhaust traps are intended to assist in the scrubbing of the exhaust gasses. The references are concerned. with the composition of the gas exiting from the trap and not particulate contamination in the processing reactor.

SUMMARY OF THE INVENTION

According to the principles of this invention, a novel exhaust particulate controller for receiving process gas from a substrate processing reactor has a housing with an inlet and an outlet. A liner is mounted within the housing. The liner has a first opening about the inlet and a second opening about the outlet. A plurality of baffles is mounted within the housing to form a plurality of chambers bounded by the liner and the plurality of baffles.

Each baffle includes a first surface bounding a first opening with a first dimension and a second surface bounding a second opening of a second dimension. The second dimension is smaller than the first dimension. An inner surface of the baffle extends from a boundary of the first opening to a boundary of the second opening to define a gas flow path through the baffle. Each baffle is positioned in the housing with the second surface closest to the outlet.

In one embodiment, the liner is selected from the group of liners consisting of a graphite liner, a silicon carbide liner, a silicon carbide coated graphite liner, a quartz liner, and a bead-blasted quartz liner. Similarly, the plurality of baffles is selected from the group of baffles consisting of graphite baffles, silicon carbide baffles, silicon carbide coated graphite baffles, quartz baffles, and bead-blasted quartz baffles.

The exhaust particulate controller has a longitudinal axis, and the gas flow path through a first baffle in the plurality of baffles is above the longitudinal axis, and the gas flow path through a second baffle located adjacent to, but separated from the first baffle is below the longitudinal axis.

The exhaust particulate controller of this invention may have any desired shape and in one embodiment, the controller has a cylindrical shape. The shape of the controller defines the shape of housing and consequently, the shape of the liner.

In another embodiment, the exhaust particulate controller for receiving process gas from a substrate processing reactor includes a cylindrical container having an inlet fixture extending from a closed end surface of the cylindrical container. The inlet fixture bounds an inlet opening. A first liner end element is mounted in an interior of the cylindrical container. The first liner end element is a cylinder with a closed end. The closed end bounds an opening substantially aligned with the inlet opening.

A first baffle is mounted in the interior of the cylindrical container adjacent the first liner end element. The first baffle includes a first surface bounding a first opening with a first dimension and a second surface bounding a second opening of a second dimension where the second dimension is smaller than the first dimension. An inner surface of the first baffle extends from a boundary of the first opening to a boundary of the second opening to define a gas flow path through the first baffle.

A liner spacer element is mounted in the interior of the cylindrical container adjacent the first baffle and then a second baffle is mounted in the interior of the cylindrical container adjacent the first liner spacer element so that the second baffle is adjacent to, but separated from the first baffle. Like the first baffle, the second baffle includes a first surface bounding a first opening with a first dimension and a second surface bounding a second opening of a second dimension where the second dimension is smaller than the first dimension. An inner surface of the second baffle extends from a boundary of the first opening to a boundary of the second opening to define a gas flow path through the second baffle.

A second liner end element is mounted in the interior of the cylindrical container after the second baffle. The second end element is a cylinder with a closed end that bounds an exhaust opening.

A cylindrical cover is removably attached to the cylindrical container. The cylindrical cover includes an outlet fixture extending from an end surface of the cylindrical cover. The outlet fixture bounds an exhaust opening substantially aligned with the exhaust opening of the second liner end element.

According to the principles of this invention, a method for controlling particulate generation by exhaust process gas from a substrate processing reactor includes:

directing the exhaust process gas through a liner having a plurality of surfaces wherein the liner is heated only by the exhaust process gas and deposits are formed on the heated liner; and orienting the plurality of surfaces to dissipate backpressure created by the exhaust process gas.

In another embodiment, a method for controlling particulate generation by exhaust process gas from a substrate processing reactor includes:

passing the exhaust process gas into an inlet of an exhaust particulate controller;

passing the exhaust process gas from the inlet through a plurality of baffles wherein each baffle includes a first surface bounding a first opening with a first dimension and a second surface bounding a second opening of a second dimension where the second dimension is smaller than the first dimension;

an inner surface of the baffle extends from a boundary of the first opening to a boundary of the second opening to define a gas flow path through the baffle; and passing the exhaust process gas from the plurality of baffles to an outlet of the exhaust particulate controller.

Each embodiment of this invention reduces the particulate contamination in the substrate processing reactor created by process gas changes in the exhausts lines. In one embodiment, the substrate processing reactor is a barrel epitaxial reactor. Consequently, the exhaust gas particulate controller and related methods result in better substrate production than prior art systems without the controller of this invention.

BRIEF DESCRIPTION OF THE DRAWINGS

FIGS. 4B to 4D are a front view, cut-away view, and a back view respectively of one embodiment of a baffle of this invention.

In the following description, elements with the same reference numeral are the same element. Also, the first digit of each element's reference numeral indicates the Figure number in which that element first appeared.

DETAILED DESCRIPTION OF THE INVENTION

In accordance with the present invention, a novel exhaust gas particulate controller 100 is included between an exhaust 125 of a barrel chemical vapor deposition reactor 120 and the gas scrubber system (not shown). Exhaust gas particulate controller 100 is positioned as close to exhaust 125 as is practical, and so is said to be approximately adjacent to exhaust 125. Exhaust gas particulate controller 100 is a passive system that prevents generation of particulates associated with gas density changes that occur during processing within reactor 120.

As is known to those of skill in the art, during a process cycle different gases from reactor 120 passed through the exhaust to the scrubbers. For example, a process may have started with nitrogen, switched to hydrogen, and then switched to silane. During each process gas change, there was some mixing of the process gases until the earlier process gas was effectively completely purged. Each of the process gasses had a different density, and during the process gas purge, density variations created backpressure in the exhaust line of the prior art barrel reactors, which, in turn, dislodged deposits in the exhaust line. The intermixing of the process gasses during the purge coupled with the backpressure generated by the purge resulted in the transportation of the dislodged deposits, as particulates, back into the reaction chamber of the prior art barrel reactors.

Exhaust gas particulate controller 100 of this invention mitigates the particulate generation associated with process gas changes in two ways. First, a liner material of exhaust gas particulate control system 100 is selected so that any deposits formed on the surfaces of the liner adhere to the surfaces more strongly than the adherence of the deposits in the prior art exhaust lines. In particular, the liner is selected so that the liner is heated only by the exhaust process gas, and deposits are formed on the heated liner surfaces.

Second, the configuration of the liner surfaces of exhaust gas particulate controller 100 minimizes the effects of backpressures created during gas density changes. As explained more completely below, the plurality of surfaces are orientated to dissipate backpressure created by said exhaust process gas. The combination of reduced backpressure effects and the enhanced adhesion of the deposits effectively eliminates the prior art problem associated with particulate contamination associated with changing the process gas.

Figure 1:
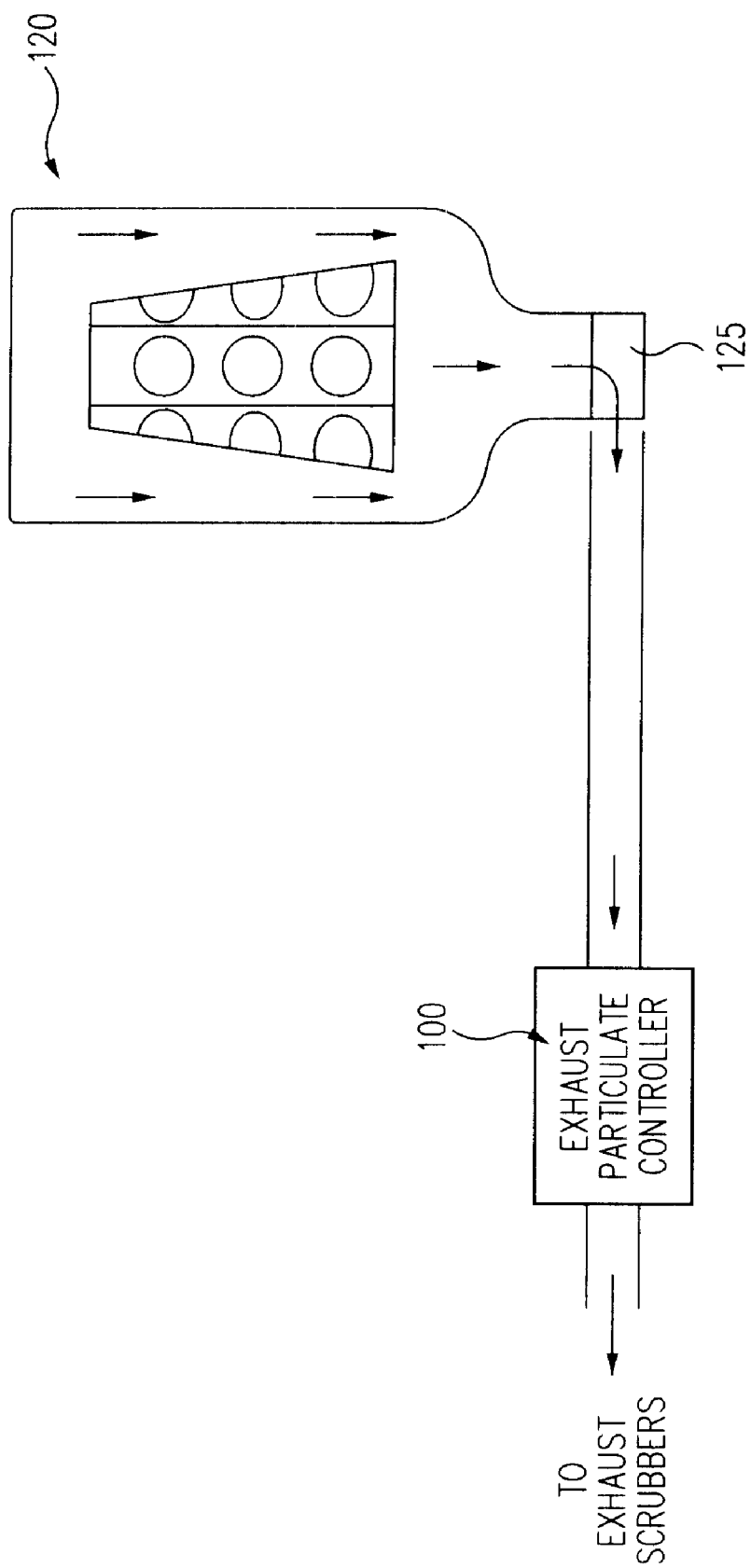
FIG. 1 is a diagram of a semiconductor substrate processing system that includes the exhaust particulate controller of this invention.
Figure 2:
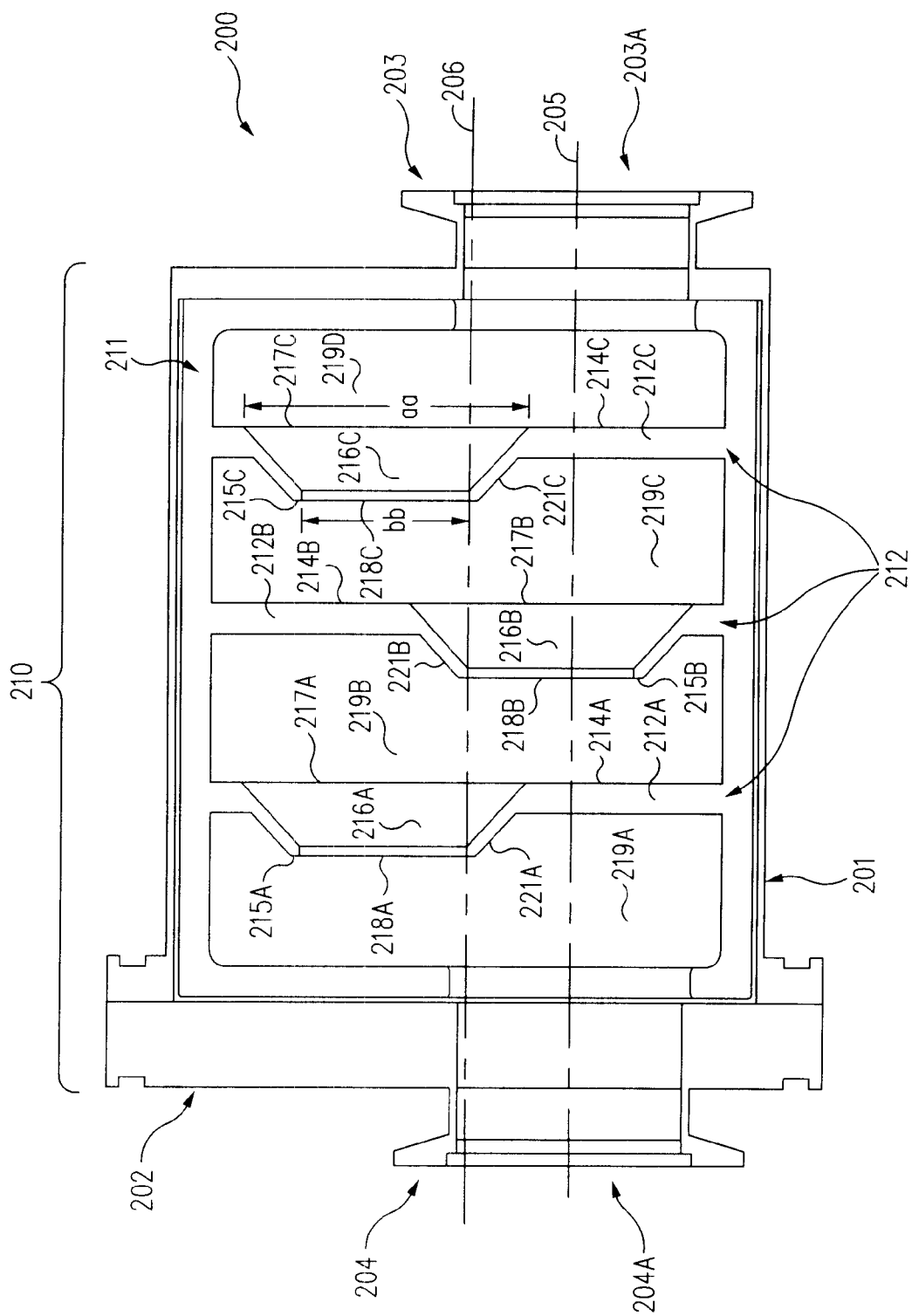
FIG. 2 is a cross-sectional view of one embodiment of the exhaust particulate controller of this invention.

FIG. 2 is a more detailed diagram of an exhaust gas particulate controller 200 that is one embodiment of exhaust gas particulate controller 100. Exhaust gas particulate controller 200 includes an outer container 210 having a right cylindrical container 201 and a cylindrical cover 202 that is removably attached to cylindrical container 201. Cylindrical container 201 includes an inlet fixture 203 with an inlet opening 203A. Cylindrical cover 202 includes an outlet fixture 204 with an outlet opening 204A. In this embodiment, inlet fixture 203 and outlet fixture 204 are centered about, e.g., orientated about, a longitudinal axis 205 that is substantially parallel to and removed from a longitudinal axis 206 of outer container 210.

Outer container 210 houses a liner 211 and a plurality of baffles 212, which define a plurality of interior chambers 219A to 219D, i.e., a plurality volumes bound by liner surfaces. The baffles are considered as part of the complete liner. Liner 211 and each baffle 212A, 212B, 212C of plurality of baffles 212 are made of graphite, silicon carbide or silicon carbide coated graphite. In another embodiment, liner 211 and plurality of baffles 212 are made of quartz, or bead-blasted quartz. An important aspect is to select the material such that for the type of deposits found in the exhaust line of reactor 100, the deposits adhere better to the heated material than to the walls of the exhaust line, e.g., the material is heated only by the exhaust process gas, in this embodiment, and deposits are formed on the heated material.

While in this embodiment exhaust gas particulate controller 200 has a cylindrical shape, this is illustrative only and is not intended to limit the exhaust gas particulate controller of this invention to any particular shape. In view of this disclosure, those of skill in the art can implement the novel exhaust gas particulate controller in any desired shape. The shape of the controller defines the shape of housing and consequently, the shape of the liner and baffles.

Another important aspect is the geometric characteristics of each of baffles 212A, 212B, 212C, which determine the gas flow patterns through controller 200. In this embodiment, each of baffles 212A to 212C are identical.

Preferably, as illustrated in FIG. 2, each baffle 212$i$, where $i$ equals A, B, or C, respectively, has a first diameter inlet opening aa in a first surface 214$i$, and a second diameter outlet opening bb in a second surface 215$i$ opposite and removed from first surface 214$i$ where second diameter bb is smaller than first diameter aa so that a conical shaped opening 216$i$ is formed that extends from first surface 214$i$ to second surface 215$i$ and is bounded by inner surface of baffle 214$i$ extending from a boundary of first diameter inlet opening aa to a boundary of second diameter outlet opening bb.

To prevent thru flow through exhaust particulate controller 200, baffles 212A to 212C are oriented so that opening 216C of baffle 212C is removed from inlet opening 203A and is positioned above longitudinal axis 206, i.e., in a first location with respect to longitudinal axis 206; opening 216B of baffle 212B is positioned below longitudinal axis 206, i.e., in a second location with respect to longitudinal axis 206; and opening 216A of baffle 212A is removed from outlet opening 204A and is positioned above longitudinal axis 206, i.e., in the first location with respect to longitudinal axis 206. As the exhaust gas flows through exhaust particulate controller 200, the greatest deposits are closest to inlet opening 203A and the deposits decrease through controller 200 to outlet opening 204A.

If backpressure and consequently back flow is generated during a process gas change, the back flow into outlet 204, if it is of sufficient force, flows into a first chamber 219A and conical edge surface 221A deflects the flow towards the bottom of system 200, i.e., in a first direction that is away from opening 218A. Accordingly, some of the backpressure and associated velocity is dissipated by the configuration of first chamber 219A. Further, since the back flow from chamber 219A to 219B is from a smaller opening 218A to a larger opening 217A, the speed of the back flow into chamber 2192 is further reduced.

Each of chambers 219B, 219C, and 219D has a configuration that is equivalent to that of chamber 219A. Hence, each subsequent chamber reduces the backpressure further. To further reduce the backpressure, chambers 219A to 219C are larger than chamber 219D. Further, the deposits are smallest where the backpressure is the greatest. Thus, the combination of use of material within controller 200 such that any deposits adhere strongly to the material, and the dissipation of the backpressure within controller 200 reduces the likelihood of particulate generation associated with the backpressure, and reduces the likelihood that if any particulates are generated, the particulates are carried back up the exhaust line into the reaction chamber.

Note that unlike the prior art passive exhaust trap system of U.S. Pat. No. 5,422,081 that was designed to scrub the exhaust gasses, controller 200 does not require precise spacing of multiple elements to assure that the exhaust gas flow is not blocked, and to assure that the exhaust gas flow interacts with the multiple elements. Moreover, the materials used in the prior art passive exhaust trip do not form a strong bond with the deposits relative to the bonds formed within controller 200.

Exhaust particulate controller 300 is a more detailed embodiment of controllers 200 and 100. Accordingly, the description of controllers 200 and 100 is incorporated herein by reference.

Inlet fixture 303 includes a KF flange 303B extending from a right cylindrical inlet channel 303C that in turn extends from a closed end surface 301A of cylindrical container 301. Inlet opening 303A extends through inlet channel 303C and the bottom of cylindrical container 301. Similarly, outlet fixture 304 includes a KF flange 304B extending from a right cylindrical inlet channel 304C that in turn extends from a circular outer end surface 302A of cylindrical cover 302. Outlet opening 304A extends through inlet channel 304C and through cover 302.

Cover 302 includes a circular grove 302B nears its outer circumference that is formed in a rim 302C of cover 302. Grove 302B is positioned so that an O-ring 305 placed in grove 302B forms a seal with a surface of a lip 301B of cylindrical container 301. Rim 302 is sized so that lip 301B fits in rim 302C and centers cover 302 on container 301.

Figure 3:
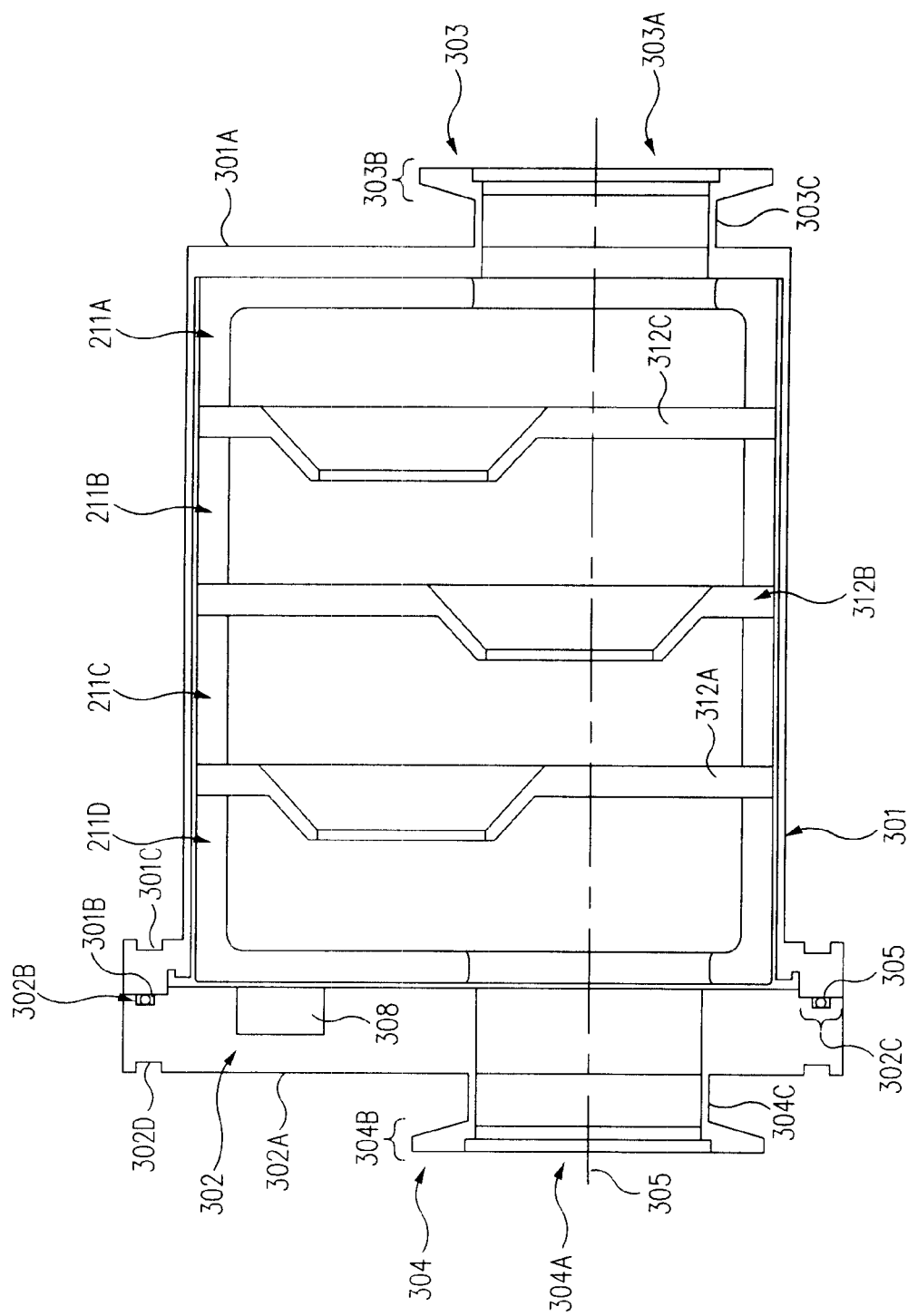
FIG. 3 is a more detailed cross-sectional view of one embodiment of the exhaust particulate controller of this invention.

Cover 302 also includes three circular openings of which only one 308 is visible in the cut-away view of FIG. 3. The three circular openings are positioned uniformly about the center of cover 302. (See FIG. 4L.) A stainless steel spring is placed in each opening. The strength of the springs is selected to hold the liner in place, but also to allow thermal expansion of the liner.

In this embodiment, liner 311 is multiple pieces 211A to 211D, and baffles 312A to 312C are discrete circular elements. First liner end element 211A is a cylinder with a closed end. In the closed end is a thru opening that is slightly larger than inlet opening 303A. Liner end element 211A is placed in container 301 so that the thru opening is substantially aligned with inlet opening 303A, and then baffle 312C is inserted in the position illustrated.

Next, cylindrical liner spacer element 211B is inserted in container 301 and then baffle 312B is inserted as shown. After baffle 312B is inserted, another cylindrical liner spacer element 211C is inserted in container 301 followed by another baffle 312A. Finally, a second liner end element 211D with a closed end is inserted. In the closed end is a thru opening that is slightly larger than outlet opening 304A. Finally, the springs are placed in cover 302 and cover 302 is placed on container 301 to that outlet opening 304A is substantially aligned with the thru opening in element 211D. The openings are said to be substantially aligned in view of the different sizes of the openings. In this embodiment, C-clamps are placed in grooves 301C and 302D to secure cover 302 and container 301 together. The operation of controller 300 is identical to that described above for controller 200.

FIGS. 4A to 4M are more detailed drawings of exhaust particulate controller 300. The materials and dimensions given below are illustrative only and are not intended to limit the invention to the specific dimensions and materials described. The criteria for selecting the liner material and baffle material were given above. The materials for the housing can be selected from any material that is not adversely affected by exposure to the exhaust gasses.

Figure 4A:
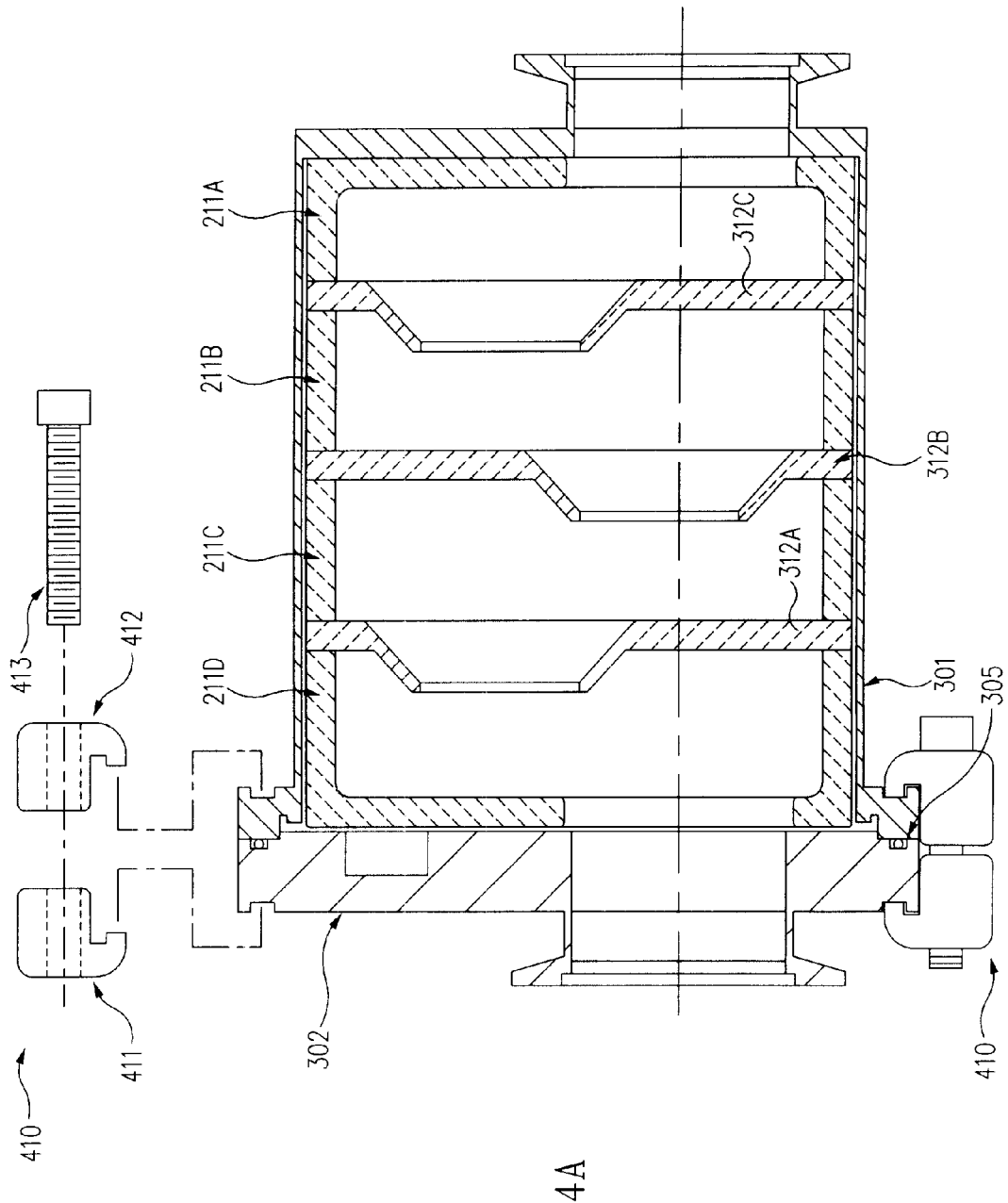
FIG. 4A is a side cut-away view of one embodiment of an exhaust particulate controller of this invention with clamps where one clamp is shown disassembled.

FIG. 4A is a side cut-away view of exhaust particulate controller 330 with clamps 410 where one clamp is shown disassembled with parts 411, and 412 and bolt 413. One clamp suitable for use with this invention is a double claw clamp with an aluminum body 411, 412 and a steel bolt 413. One source for such a clamp is MDC, 23842 Cabot Boulevard, Hayward, Calif., 94545, USA under Part No. 802000.

FIGS. 4B to 4D are a front view, cut-away view, and a back view respectively of baffle 312i where i is A to C. Table 1 gives dimensions for one embodiment of baffle 312i. In this embodiment, baffle 312i is made of graphite.

TABLE 1

| Reference No. | Dimension Inches (cm) (Unless otherwise Specified) |
|---|---|
| 4B1 | 4.810 (12.217) |
| 4B2 | 1.906 radius (4.841) |
| 4C1 | 0.125 (0.318) |
| 4C2 | 90° |
| 4C3 | 1.38 (3.505) |
| 4C4 | 0.094 (0.239) |
| 4C5 | 0.250 (0.635) |
| 4C6 | 0.625 (1.588) |
| 4D1 | 0.458 (1.163) |
| 4D2 | 0.083 (0.211) |
| 4D3 | 1.458 (3.703) |
| 4D4 | 1.833 (4.656) |
| 4D5 | 1.375 (3.493) |
| 4D6 | 0.125 (0.318) |
| 4D7 | 0.125 radius (0.318) |
| 4D8 | 1.244 (3.160) |
| 4D9 | 2.488 (6.320) |

Figure 4F:
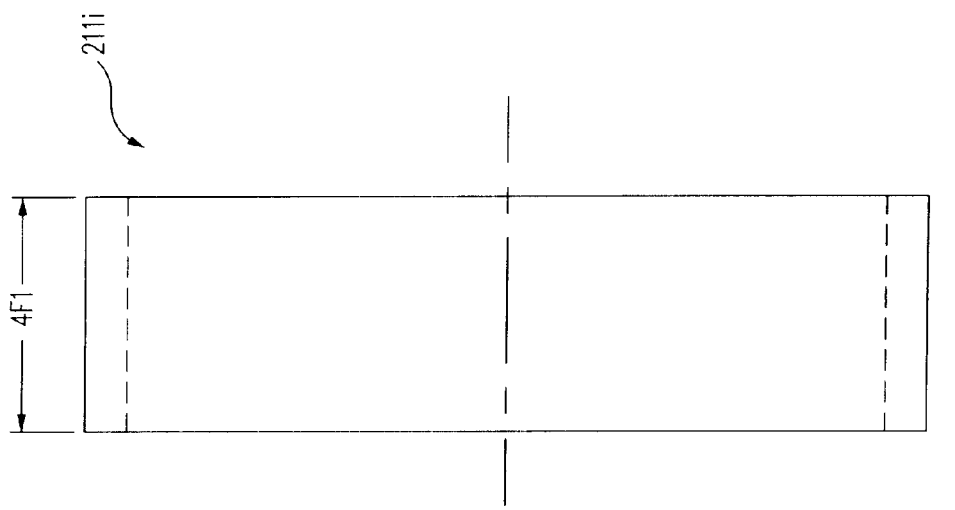
FIGS. 4E and 4F are a side and end view of one embodiment of a spacer according to the principles of this invention.
Figure 4E:
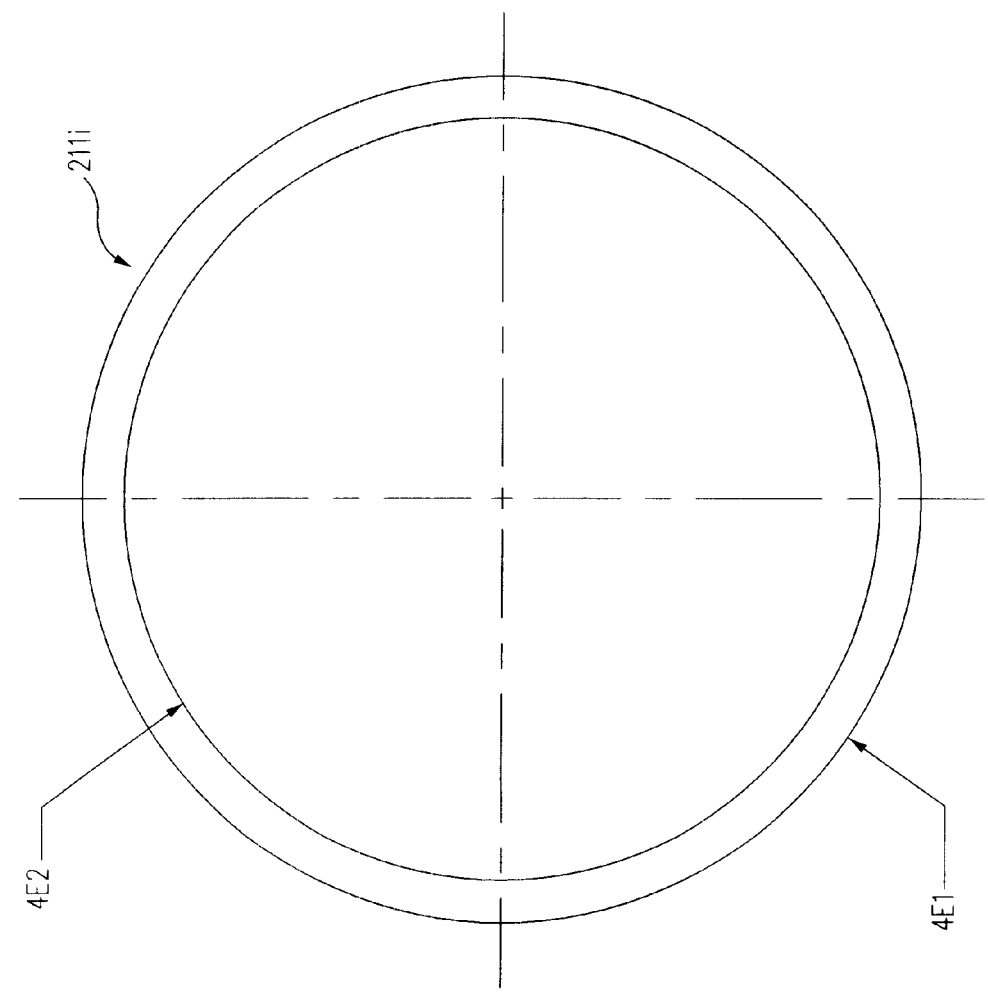

FIGS. 4E and 4F are a side and end view of spacer 211i, where i is B and C (See FIG. 3). Table 2 gives dimensions for one embodiment of spacer 211i. In this embodiment, spacer 211i is made of graphite.

TABLE 2

| Reference No. | Dimension Inches (cm) (Unless otherwise Specified) |
|---|---|
| 4E1 | 4.810 (12.217) |
| 4E2 | 4.31 (10.947) |
| 4F1 | 1.250 (3.175) |

Figure 4G:
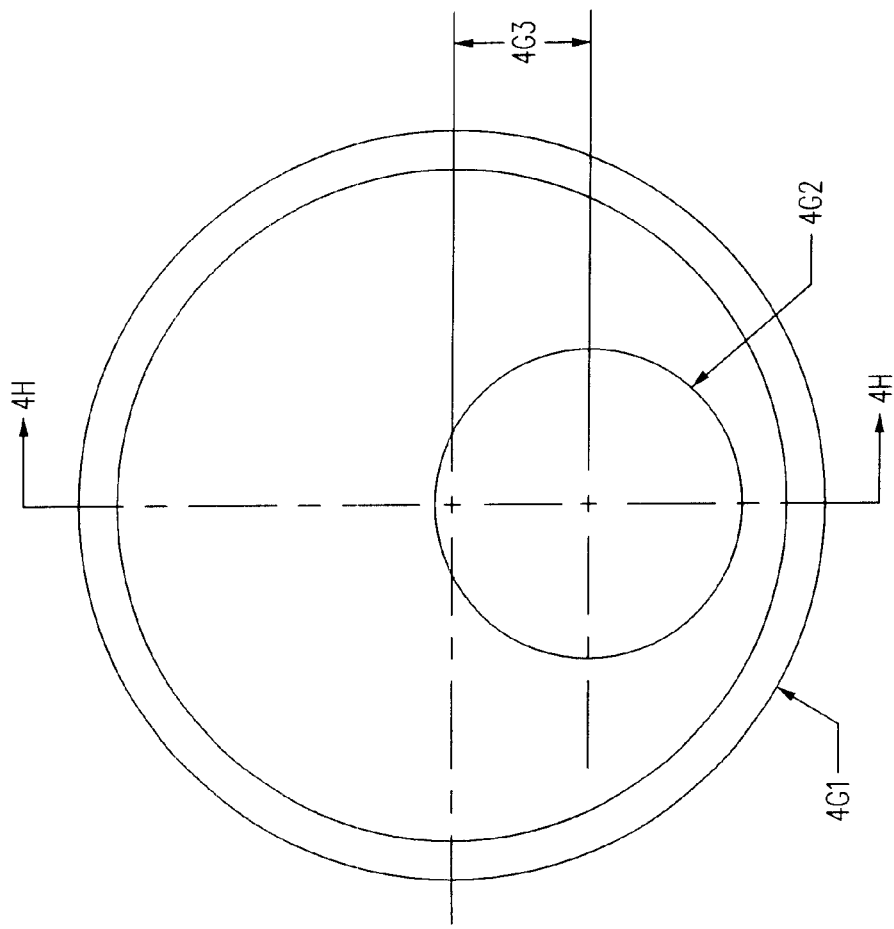
FIGS. 4G and 4H are a front and side cut-away view, respectively, of one embodiment of liner end elements of this invention.
Figure 4H:
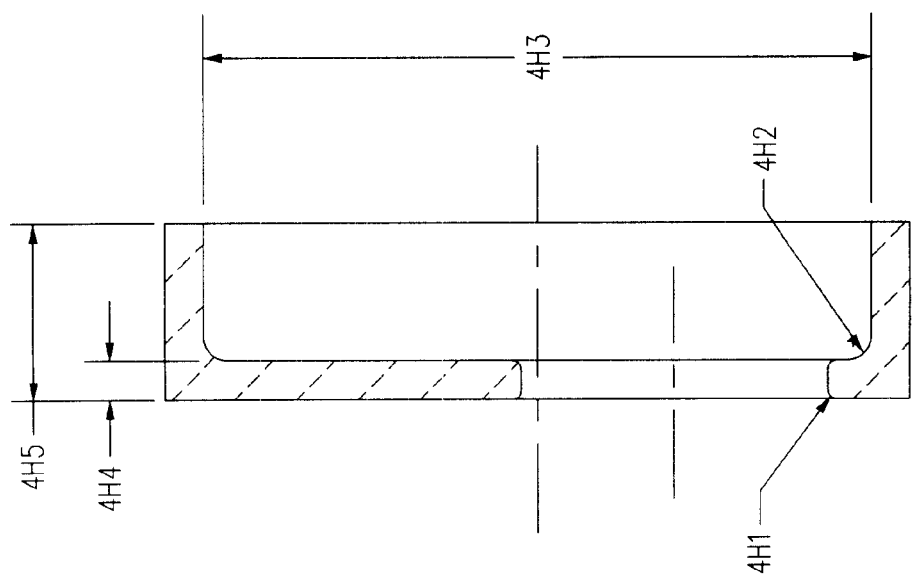

FIGS. 4G and 4H are a front and side cut-away view, respectively, of liner end elements 211j, where j is A and D (See FIG. 3). Table 3 gives dimensions for one embodiment of liner end element 211A, while Table 4 gives dimensions for one embodiment of liner end element 211D. In this embodiment, end elements 211A and 211D are made of graphite.

TABLE 3

| Reference No. | Dimension Inches (cm) (Unless otherwise Specified) |
|---|---|
| 4G1 | 4.810 (12.217) |
| 4G2 | 2.00 (5.08) |
| 4G3 | 0.875 (2.223) |
| 4H1 | 0.060 Radius (0.152) |
| 4H2 | 0.125 Radius (0.318) |
| 4H3 | 4.310 (10.947) |
| 4H4 | 0.250 (0.635) |
| 4H5 | 1.125 (2.858) |

TABLE 4

| Reference No. | Dimension Inches (cm) (Unless otherwise Specified) |
|---|---|
| 4G1 | 4.810 (12.217) |
| 4G2 | 2.00 (5.08) |
| 4G3 | 0.875 (2.223) |
| 4H1 | 0.060 Radius (0.152) |
| 4H2 | 0.125 Radius (0.318) |
| 4H3 | 4.310 (10.947) |
| 4H4 | 0.250 (0.635) |
| 4H5 | 1.500 (3.810) |

Figure 4I:
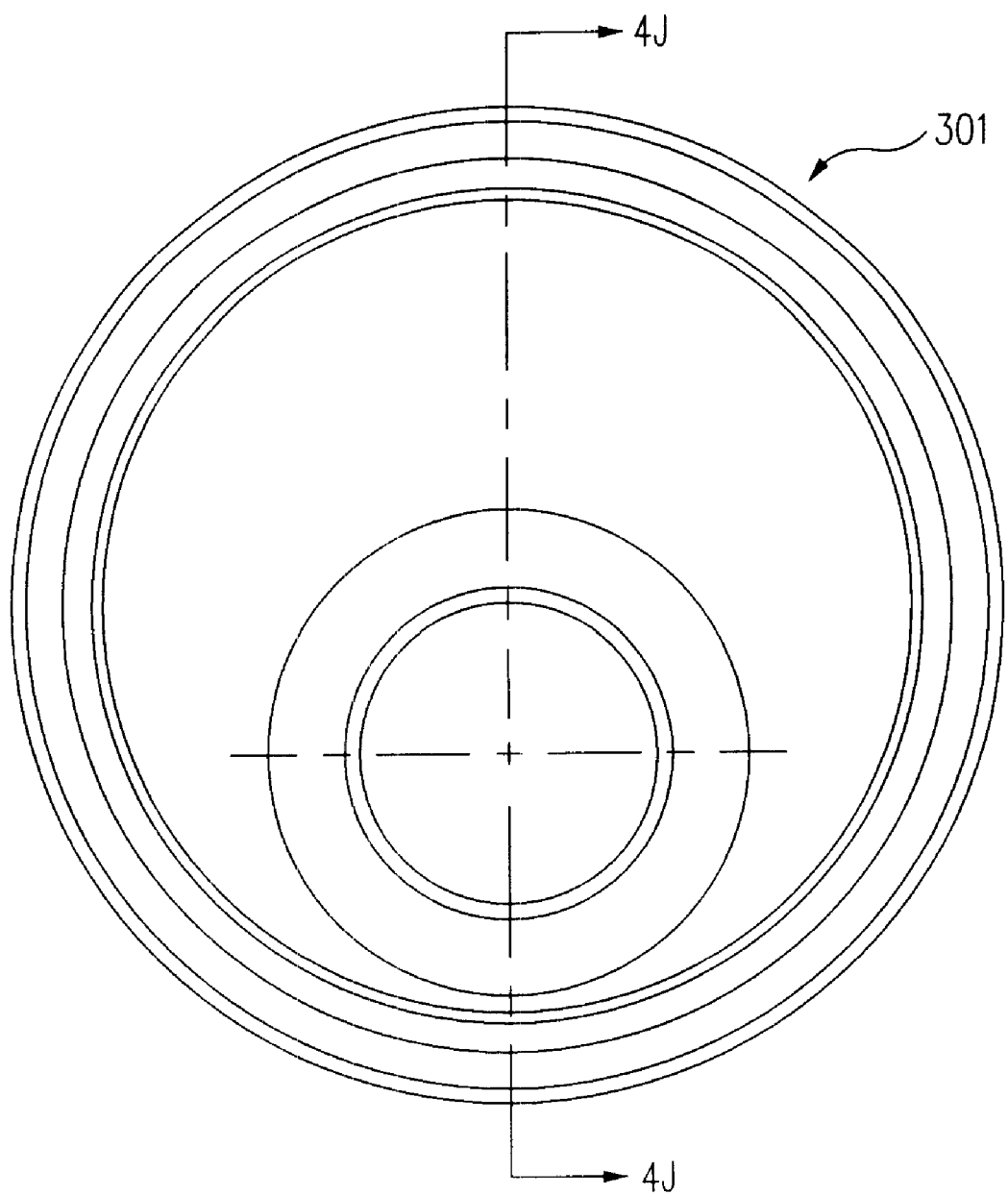
FIGS. 4I and 4J are an end view and a side cut-away view, respectively, of one embodiment of a cylindrical container of this invention.
Figure 4J:
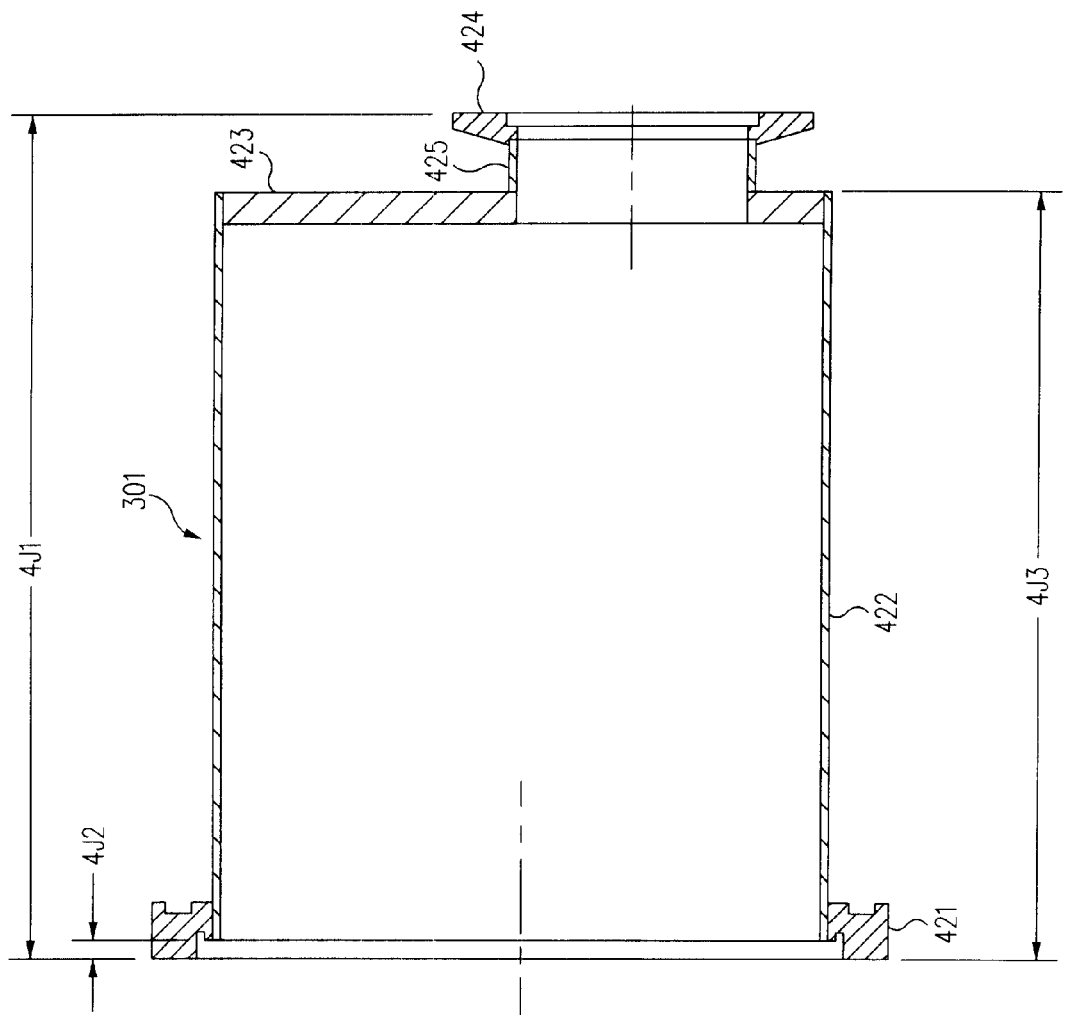

FIGS. 4I and 4J are an end view and a side cut-away view, respectively, of cylindrical container 301. In this embodiment, cylindrical container is made of five parts 421 to 425 that are 316 stainless steel with an electro polish finish. TABLE 5 gives a name and a size of the material from which each part is made.

TABLE 5

| Ref. No. | Name | Dimension Inches(cm) (Unless otherwise Specified) |
|---|---|---|
| 421 | Bottom Plate | 6.00 (15.24) × 0.437 (1.110) |
| 422 | Body Tube | 5.000 (12.700) O.D., 0.065 (0.165) Thick Wall |
| 423 | Top Plate | 3.75 (9.525) Diameter × 0.250 (0.635) |
| 424 | KP Flange | NW-50 |
| 425 | Tubing | 2.000 (5.080) O.D. × 1.870 (4.750) I.D. |

O.D. is outside diameter.
I.D. is inside diameter.

Table 6 gives dimensions for one embodiment of cylindrical container 301 as illustrated in FIG. 4J.

TABLE 6

| Reference No. | Dimension Inches (cm) (Unless otherwise Specified) |
|---|---|
| 4J1 | 6.84 (17.374) |
| 4J2 | 0.124 (0.315) |
| 4J3 | 6.22 (15.799) |

Figure 4K:
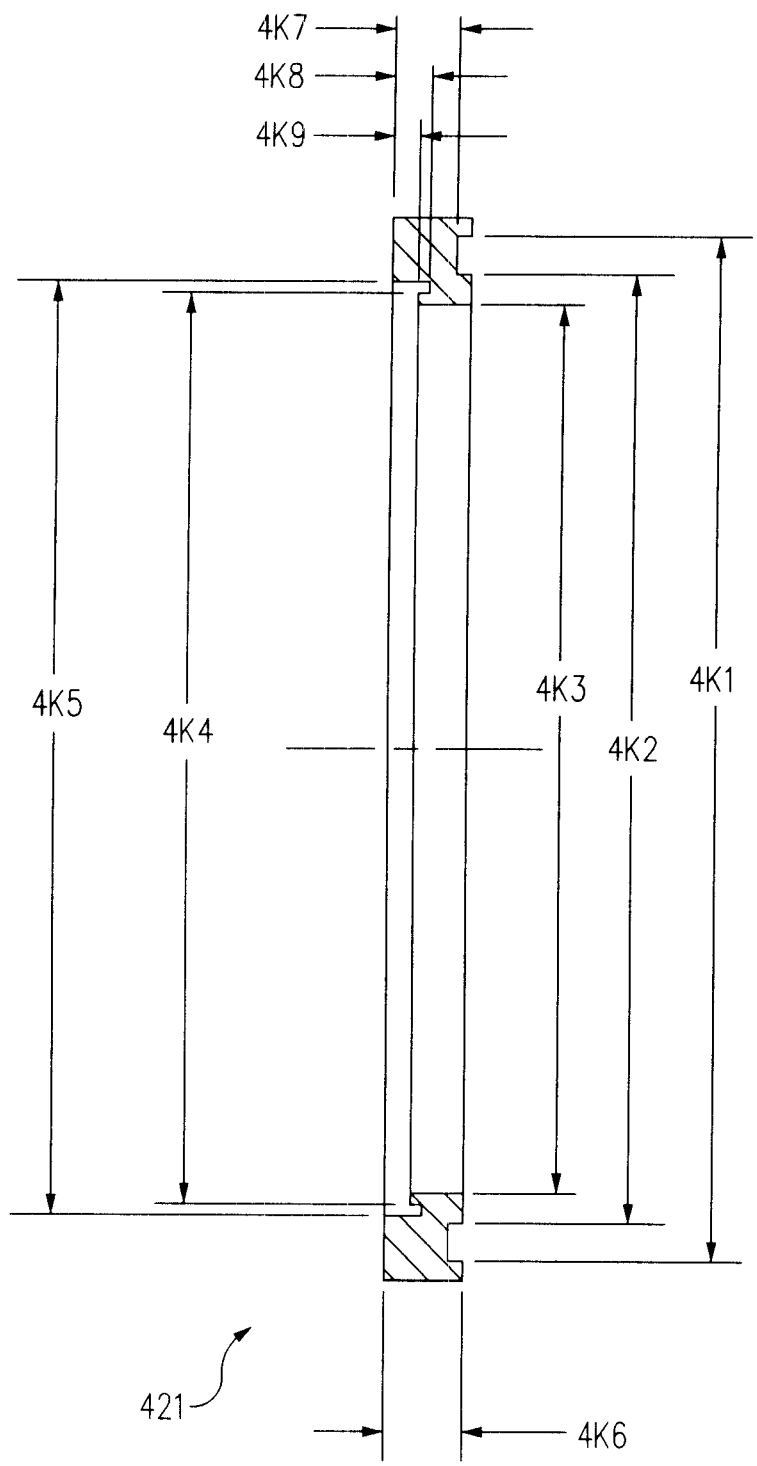
FIG. 4K is a more detailed cut-away view of one embodiment of a bottom plate of this invention.

FIG. 4K is a more detailed cut-away view of bottom plate 421. Table 7 gives dimensions for one embodiment of bottom plate 421

TABLE 7

| Reference No. | Dimension Inches (cm) (Unless otherwise Specified) |
|---|---|
| 4K1 | 5.80 (14.732) |
| 4K2 | 5.37 (13.640) |
| 4K3 | 5.010 (12.725) |
| 4K4 | 5.12 (13.005) |
| 4K5 | 5.260 (13.360) |
| 4K6 | 0.437 (1.110) |
| 4K7 | 0.352 (0.894) |
| 4K8 | 0.186 (0.472) |
| 4K9 | 0.124 (0.315) |

Figure 4L:
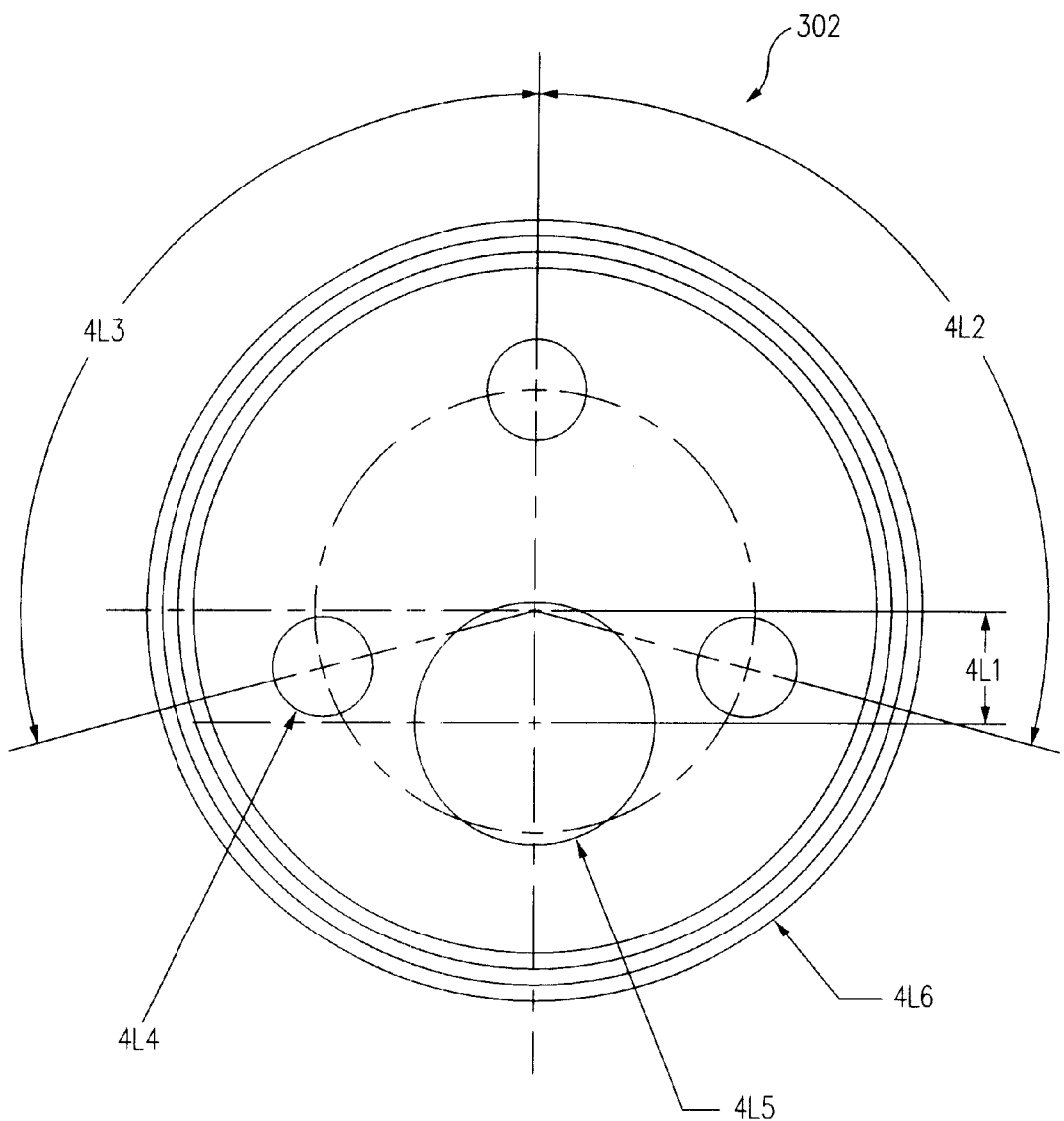
FIGS. 4L and 4M are an end view and a side cut-away view, respectively, of one embodiment of a cylindrical cover of this invention.
Figure 4M:
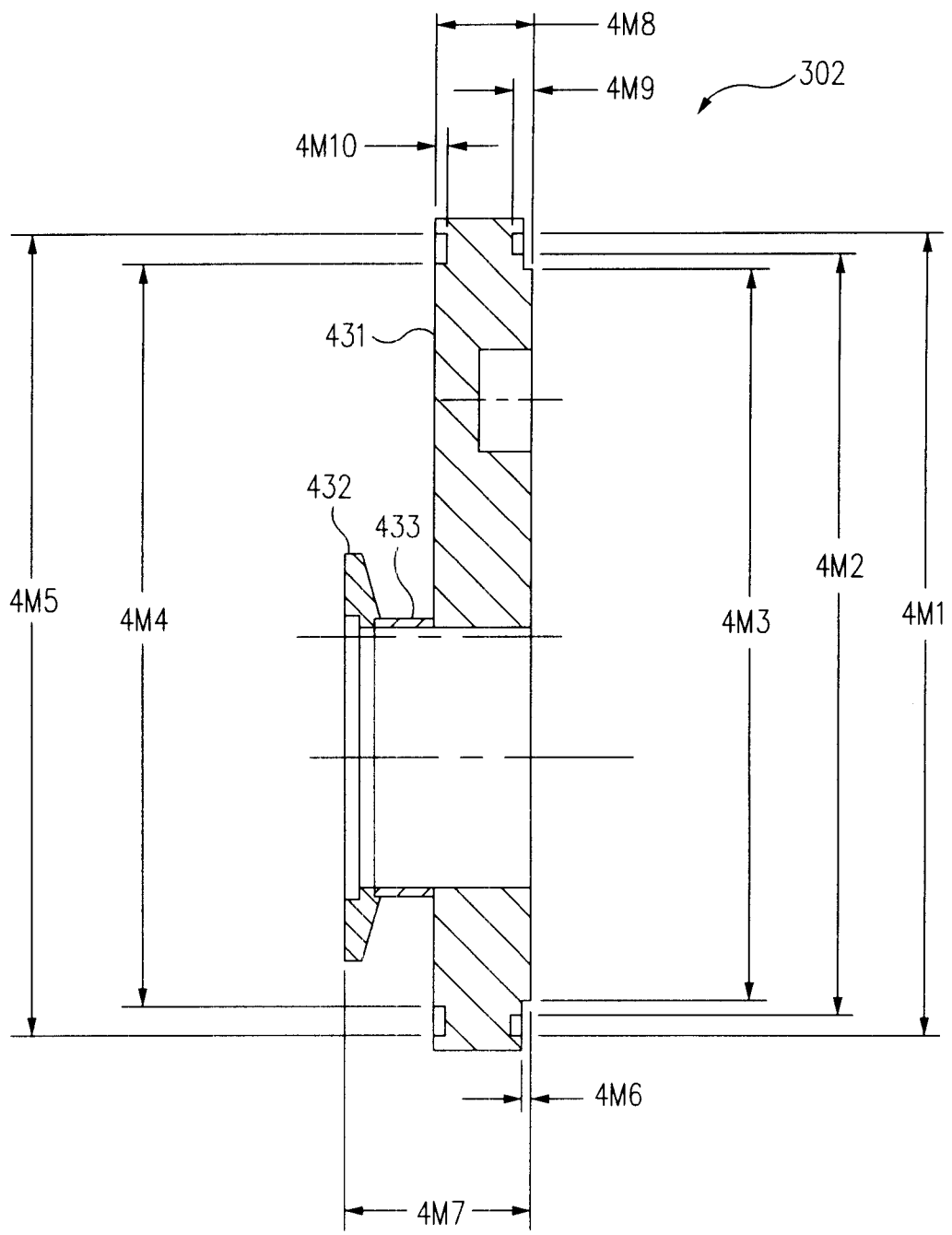

FIGS. 4L and 4M are an end view and a side cut-away view, respectively, of cylindrical cover 302, sometimes called a flange end cap. In this embodiment, cylindrical cover 302 is made of three parts 431 to 433 (FIG. 4M) that are 316 stainless steel with an electro polish finish. TABLE 8 gives a name and a size of the material from which each part is made.

TABLE 8

| Ref. No. | Name | Dimension Inches(cm) (Unless otherwise Specified) |
|---|---|---|
| 431 | Plate | 6.00 (15.24) Diameter |
| 432 | KF Flange | NW-50 |
| 433 | Tubing | 2.000 (5.080) O.D. × 1.870 (4.750) I.D. |

O.D. is outside diameter.
I.D. is inside diameter.

Table 9 gives dimensions for one embodiment of cylindrical cover 302 as illustrated in FIG. 4L.

TABLE 9

| Reference No. | Dimension Inches (cm) (Unless otherwise Specified) |
|---|---|
| 4L1 | 0.875 (2.223) |
| 4L2 | 105° |
| 4L3 | 105° |
| 4L4 | 0.750 (1.905) Diameter × 0.375 (0.953) deep C'Bore on a 3.38 (8.585) diameter B.C. |
| 4L5 | 1.870 (4.750) |
| 4L6 | 6.00 (15.240) |

Table 10 gives dimensions for one embodiment of cylindrical cover 302 as illustrated in FIG. 4M.

TABLE 10

| Reference No. | Dimension Inches (cm) (Unless otherwise Specified) |
|---|---|
| 4M1 | 5.767 (14.648) |
| 4M2 | 5.487 (13.937) |
| 4M3 | 5.240 (13.310) |
| 4M4 | 5.37 (13.640) |
| 4M5 | 5.80 (14.732) |
| 4M6 | 0.062 (0.157) |
| 4M7 | 1.31 (3.327) |
| 4M8 | 0.687 (1.745) |
| 4M9 | 0.144 (.366) |
| 4M10 | 0.09 (0.229) |

For the embodiment of FIGS. 4A to 4M, O-ring 305 is a silicone O-ring with a 5.50 inch inside diameter, a 5.68 inch outside diameter, and a 0.09 inch cross section width. A wave spring that is placed in holes 308 is a flat wire compression spring that has a 0.750 inch outside diameter, a 13 pound load, and a spring rate of 70 lbs/in. One wave stainless steel spring suitable for use in this invention is provided by Smalley Steel Ring Company of Wheeling, Ill., U.S.A., Part No. CS075-M4-S17. The characteristics of this spring are:

| | |
|---|---|
| Operates in Bore Diameter | 0.750 inches |
| Load | 13 pounds |
| Work Height | 0.314 inches |
| Free Height | 0.500 inches |
| Number of Turns | 6 |
| Number of Waves | 3.5 |
| Wire Thickness × Radial Wall | 0.10 in. × 0.78 in. |
| Spring Rage | 70 lbs/in |

The drawings and the forgoing description gave examples of the present invention. The scope of the present invention, however, is not limited by these specific examples. Numerous variations, whether explicitly given in the specification, such as differences in structure, dimension, and use of material, are possible. The scope of the invention is at least as broad as given by the following claims.

We claim:

1. An exhaust particulate controller for receiving process gas from a substrate processing reactor, said exhaust particulate controller comprising:

a housing having an inlet and an outlet;

a liner mounted within said housing, said liner having a first opening about said inlet and a second opening about said outlet; and a plurality of baffles mounted within said housing to form a plurality of chambers bounded by said liner and said plurality of baffles, wherein each baffle includes a first surface bounding a first opening with a first dimension and a second surface bounding a second opening of a second dimension where said second dimension is smaller than said first dimension;

an inner surface of said baffle extends from said first opening to said second opening to define a gas flow path through said baffle; and each baffle is positioned in said housing with said second surface closest to said outlet.

2. The exhaust particulate controller of claim 1 wherein said liner is selected from the group of liners consisting of graphite liners, silicon carbide liners, silicon carbide coated graphite liners, quartz liners, and bead-blasted quartz liners.

3. The exhaust particulate controller of claim 1 wherein said plurality of baffles is selected from the group of baffles consisting of graphite baffles, silicon carbide baffles, silicon carbide coated graphite baffles, quartz baffles, and bead-blasted quartz baffles.

4. The exhaust particulate controller of claim 1 further comprising a longitudinal axis wherein a gas flow path through a first baffle in said plurality of baffles is above said longitudinal axis, a gas flow path through a second baffle located adjacent to the first baffle is below said longitudinal axis.

5. The exhaust particulate-controller of claim 1 wherein said housing is stainless steel.

6. The exhaust particulate controller of claim 1 wherein said housing is cylindrical.

7. An exhaust particulate controller for receiving process gas from a substrate processing reactor, said exhaust particulate controller comprising:

a cylindrical container having an inlet fixture extending from a closed end surface of said cylindrical container wherein said inlet fixture bounds an inlet opening;

a first liner end element mounted in an interior of said cylindrical container wherein said first liner end element comprises a cylinder with a closed end wherein said closed end bounds an opening substantially aligned with said inlet opening;

a first baffle mounted in said interior of said cylindrical container adjacent said first liner end element, said first baffle comprising a first surface bounding a first opening with a first dimension and a second surface bounding a second opening of a second dimension where said second dimension is smaller than said first dimension, and an inner surface of said first baffle extends from a boundary of said first opening to a boundary of said second opening to define a gas flow path through said first baffle;

a liner spacer element mounted in said interior of said cylindrical container adjacent said first baffle;

a second baffle mounted in said interior of said cylindrical container adjacent said first liner spacer element, said second baffle comprising a first surface bounding a first opening with a first dimension and a second surface bounding a second opening of a second dimension where said second dimension is smaller than said first dimension, and an inner surface of said second baffle extends from said first opening to said second opening to define a gas flow path through said second baffle;

a second liner end element mounted in said interior of said cylindrical container after said second baffle wherein said second liner end element comprises a cylinder with a closed end wherein said closed end bounds an exhaust opening; and a cylindrical cover removably attached to said cylindrical container, said cylindrical cover having an outlet fixture extending from an end surface of said cylindrical cover wherein said outlet fixture bounds an exhaust opening substantially aligned with said exhaust opening of said second liner end element.

8. The exhaust particulate controller of claim 7 wherein said first and second liner end elements, said first and second baffles, and said liner spacer element are made of any one of graphite, silicon carbide, silicon carbide coated graphite, quartz, and bead-blasted quartz.

9. The exhaust particulate controller of claim 7 wherein said first and second liner end elements, said first and second baffles, and said liner spacer element are graphite.

10. The exhaust particulate controller of claim 7 further comprising a longitudinal axis wherein said gas flow path through said first baffle is above said longitudinal axis and said gas flow path through said second baffle is below said longitudinal axis.

11. The exhaust particulate controller of claim 7 wherein said cylindrical container is stainless steel.

12. A method for controlling particulate generation by exhaust process gas from a substrate processing reactor comprising:

directing said exhaust process gas from said substrate processing reactor through a liner having a plurality of baffle surfaces wherein said liner is heated only by said exhaust process gas and deposits are formed on said heated liner from said exhaust process gas from said substrate processing reactor; and orienting said plurality of baffle surfaces to dissipate backpressure created by a density change of said exhaust process gas from said substrate processing reactor thereby controlling particulate generation from said deposits.

13. The method of claim 12 wherein said liner is made of any one of graphite, silicon carbide, silicon carbide coated graphite, quartz, and bead-blasted quartz.

14. A method for controlling particulate generation by exhaust process gas from a substrate processing reactor comprising:

passing said exhaust process gas into an inlet of an exhaust particulate controller;

passing said exhaust process gas from said inlet through a plurality of baffles
wherein each baffle includes a first surface bounding a first opening with a first dimension and a second surface bounding a second opening of a second dimension where said second dimension is smaller than said first dimension;
an inner surface of said baffle extends from a boundary of said first opening to a boundary of said second opening to define a gas flow path through said baffle; and
said plurality of baffles are heated by said exhaust process gas and deposits form on at least one baffle in said plurality of baffles from said exhaust process gas; and passing said exhaust process gas from said plurality of baffles to an outlet of said exhaust particulate controller wherein said plurality of baffles dissipate backpressure created by a density change of said exhaust process gas from said substrate processing reactor thereby controlling particulate generation from said deposits.

15. A method for controlling particulate generation by exhaust process gas from a substrate processing reactor comprising:

passing said exhaust process gas into an inlet of an exhaust particulate controller;

passing said exhaust process gas from said inlet through a plurality of graphite baffles
wherein each graphite baffle includes a first surface bounding a first opening with a first dimension and a second surface bounding a second opening of a second dimension where said second dimension is smaller than said first dimension;
an inner surface of said graphite baffle extends from a boundary of said first opening to a boundary of said second opening to define a gas flow path through said graphite baffle; and passing said exhaust process gas from said plurality of graphite baffles to an outlet of said exhaust particulate controller.

16. A method for controlling particulate generation by exhaust process gas from a substrate processing reactor comprising:

passing said exhaust process gas into an inlet of an exhaust particulate controller;

passing said exhaust process gas from said inlet through a plurality of baffles
wherein each baffle includes a first surface bounding a first opening with a first dimension and a second surface bounding a second opening of a second dimension where said second dimension is smaller than said first dimension;
an inner surface of said baffle extends from a boundary of said first opening to a boundary of said second opening to define a gas flow path through said baffle; and
said plurality of baffles are made of any one of silicon carbide, silicon carbide coated graphite, quartz, and bead-blasted quartz; and passing said exhaust process gas from said plurality of baffles to an outlet of said exhaust particulate controller.

* * * * *